Feb. 24, 1925.
C. W. FICK
1,527,637
SEGREGATED DRIVE FOR PAPER MAKING MACHINES AND THE LIKE
Filed July 12, 1922
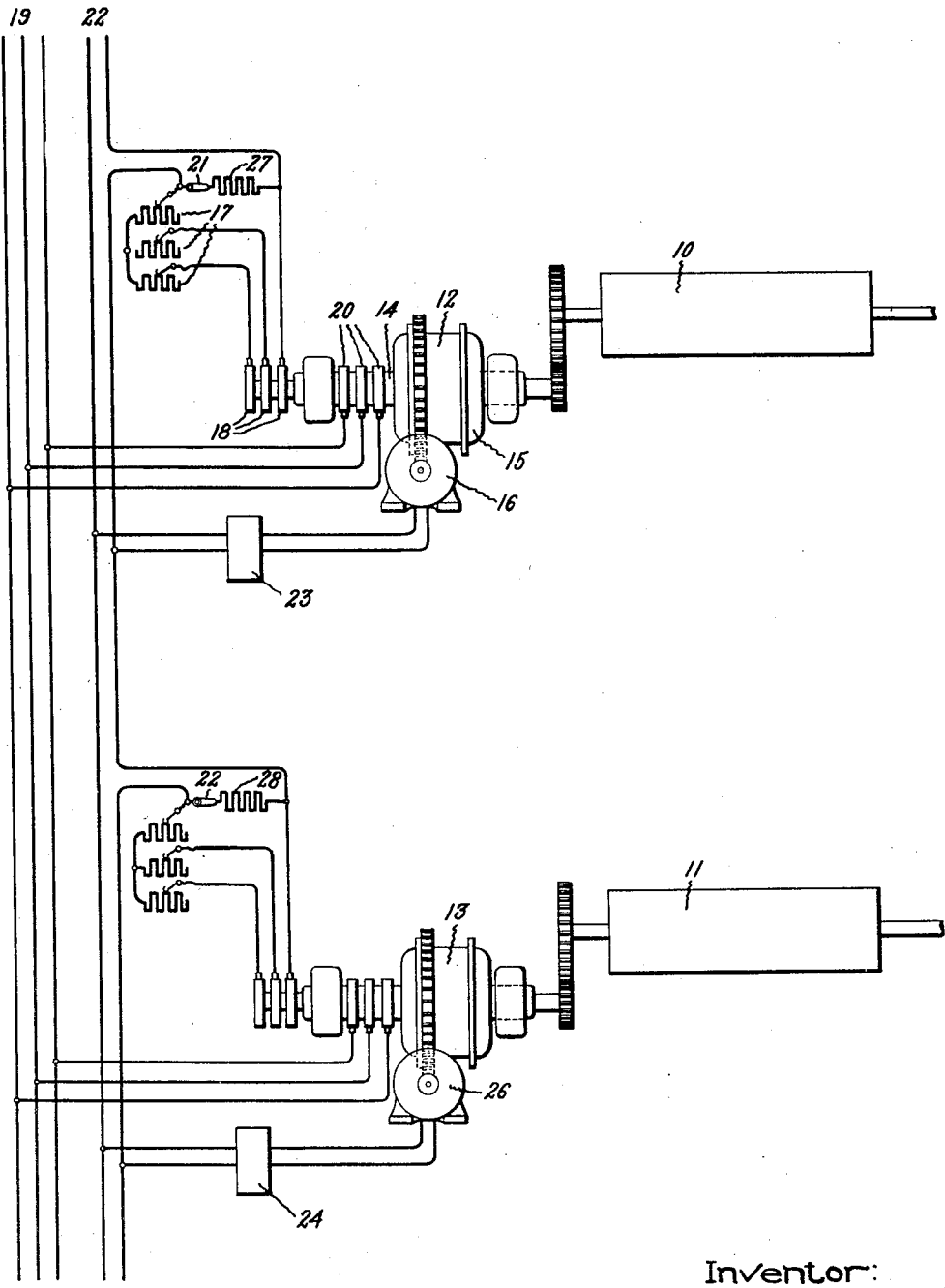
Inventor:
Clarence W. Fick.

Patented Feb. 24, 1925.

1,527,637

UNITED STATES PATENT OFFICE.

CLARENCE W. FICK, OF SCHENECTADY, NEW YORK, ASSIGNOR TO GENERAL ELECTRIC COMPANY, A CORPORATION OF NEW YORK.

SEGREGATED DRIVE FOR PAPER-MAKING MACHINES AND THE LIKE.

Application filed July 12, 1922. Serial No. 574,443.

*To all whom it may concern:*

Be it known that I, CLARENCE W. FICK, a citizen of the United States, residing at Schenectady, county of Schenectady, State of New York, have invented certain new and useful Improvements in Segregated Drives for Paper-Making Machines and the like, of which the following is a specification.

My invention relates to improvements in arrangements for establishing and automatically maintaining a desired speed relation of the separate driving motors for the separate units of a machine, such as a paper making machine or the like.

One of the objects of the invention is the provision of a simple and effective arrangement in which the speed of each of the separate driving motors of the machine may be independently adjusted while the machines are operating and the adjustment thus established be automatically maintained by means of electrical synchronizing connections between the driving motors.

A further object of the invention is the elimination of the automatically operated rheostats, speed cones and other complications of former drives of this nature.

A still further object of the invention is to provide a simple and effective arrangement for adjusting the "draw" between the units of the machine.

The present invention is particularly directed to improvements of the segregated drive for paper making machines and the like of Wilbur L. Merrill, for which he filed an application for patent on July 12, 1922, Serial No. 574,574, patented Aug. 14, 1923, No. 1,465,087, and assigned the same to the same assignee to which the present invention is assigned. In the said Merrill patent there is described and broadly claimed an arrangement in which each of the separate motors for driving the units of the machine have rotatable field and armature members with one of the members of each motor connected to the machine for driving. Electrical synchronizing connections are provided between the various motors to automatically maintain a predetermined speed relation of the motors. In order to vary the speed relation of the motors to be thus automatically maintained, the field member of a motor or the field members of selected motors are rotated. The particular arrangement disclosed by Merrill for carrying into effect his broad idea comprises separate direct current driving motors having armature taps and slip rings connected to a synchronizing tie-in bus so that the predetermined speed relation of the motors is maintained by an interchange of power between the motors through the tie-in bus synchronizing connection.

In carrying my invention into effect, I employ alternating current motors having rotatable field and armature members which are caused to operate as synchronous motors receiving power from a suitable source of supply. The speed relation of the motors may be varied at will while the machine is operating by rotating one of the rotatable members of the motors and the speed relation will be automatically maintained by the source of supply. The motors are preferably of the wound rotor or armature type, so that they may be started as asynchronous motors and brought up to speed by controlling the resistance of the rotor circuits. After a motor has started the unit of the machine and has come up to operating speed, a direct current source of supply is connected to the rotors of the motors to cause them to operate as synchronous motors. The synchronizing of the motors in a desired speed relation is thus very simple, the power supply serves as the synchronizing connections between the motors, and the arrangement has features of simplicity and effectiveness, as will be perceived from an understanding of the invention.

For a better understanding of the invention, reference is had to the accompanying drawing wherein I have illustrated the invention in very simplified diagram in order to explain the principles thereof. Referring to the drawing, the units of the machine 10 and 11 are arranged to be separately driven by means of the electric motors 12 and 13 respectively. These motors are of the asynchronous alternating current type having rotatable field or "stator" members and armature or rotor members arranged to be connected to the machine units for driving the same. The electric motor 12 comprises a rotor member 14 which is connected by the gearing shown to the machine unit 10, and the motor also has a field member 15 which is mounted in bearings so as to be capable of rotation with respect to the armature or rotor 14. The electric controlling motor 16 is provided for rotating the field frame of stator 15 for the purpose of regulating the speed of the driving motor 12 and hence the speed of the machine unit 10. The electric driving motor 12 is preferably of the type having a wound rotor connected to the starting resistors 17 through the slip rings 18. The windings of the field frame are connected to the alternating current source of supply 19 through the slip rings 20.

The driving motors 12 and 13 are started as asynchronous motors in the ordinary way, the field members of the motors being held stationary. The arrangement for starting and regulating the speed of the driving motor 13 is identical with that for the driving motor 12, so that a description of one arrangement will suffice for an understanding of the general arrangement. After the driving motor 12 has been started in the ordinary way and has been brought up to substantially full speed operation by regulating the rotor resistors 17, the switch 21 is opened, thereby energizing the rotor windings from the direct current source of supply 22. This will cause the driving motor 12 to change from an asynchronous motor to a synchronous motor. The driving motor 13 is started as an asynchronous motor and finally given a synchronous motor characteristic in the same manner as that explained in connection with the driving motor 12. Assume that the driving motors have been thus started and that the switches 21 and 22 are open so that the driving motors are operating as synchronous motors, and that it is desired to vary the speed of one motor with respect to the other. Let it be assumed that it is desired to increase the speed of the driving motor 12 while the machine is operating. The controller 23 for the controlling motor 16 will be operated so as to energize the controlling motor 16 and thus rotate the field member 15 in the desired direction and at the proper speed to obtain the desired speed for the machine unit 10. The driving motor 12 will continue to operate as a synchronous motor while this speed change is being effected, since the relative rotation of armature and field members of the motor will remain the same. After the speed has been thus adjusted, it will be automatically maintained through the alternating current source of supply 19 which serves as a synchronizing connection. It will be understood, of course, that the speed of the driving motor 13 may be varied with respect to the driving motor 12 by operating the controller 24 to energize the controlling motor 26 and thus rotate the field frame member of driving motor 13 in the proper direction and at the proper speed.

I have shown the resistors 27 and 28 connected in series with the direct current source of supply 22 when the driving motors 12 and 13 are at rest and while they are being started. This is for the purpose of arranging the connections so that if desired an ordinary direct current generator of standard voltage may be provided for supplying the direct current excitations for the motors. It will be understood, of course, that while I have shown my invention in connection with the operation and automatic regulation of two machine units, the invention is applicable to any number of units.

It will be observed that the source of supply 19 serves as the synchronizing connection for the various motors, that speed cones, automatic rheostats and the like are eliminated, and that the general arrangement is extremely simple. The adjustment of the draw between the units of the machine is very simple, and after having once been adjusted, the speed relation of the motors is automatically maintained. Wound rotor type alternating current type motors are very desirable for installations of this character, because of the fact that there are practically no troubles due to commutation, and no special generating apparatus need be provided for supplying the power to operate the units, because of the fact that many modern mills are already provided with alternating current generating apparatus or receive alternating current from transmission lines.

What I claim as new and desire to secure by Letters Patent of the United States, is:—

1. A segregated drive for paper making machines or the like, comprising separate asynchronous alterating current electric motors connected to an alternating current source of supply and having rotatable field and armature members, one of the members of each of the said motors arranged to be connected to a unit of the machine for driving the same, means for supplying direct current excitation to the motors to cause the same to operate as synchronous motors and automatically maintain a predetermined speed relation of the motors, and means for rotating the other members of the motors to vary the speed relation of the motors to be automatically maintained.

2. A segregated drive for paper making machines or the like comprising a separate synchronous motor connected to an alternating current source of supply for driving each of the units of the machine, each of the said motors having rotatable field and armature members with one of the members arranged for connection to a unit of the machine, and means for rotating the other members of the motors to vary the speed relation of the motors to be automatically maintained by the alternating current source of supply.

3. A segregated drive for paper making machines or the like, comprising a separate alternating current asynchronous motor of the wound rotor or armature type for driving each of the separate units of the machine, each of the said motors having a rotatable field or stator member, means for connecting a direct current source of supply to the motor armatures to cause the motors to operate as synchronous motors and automatically maintain a predetermined speed relation of the motors, and means for rotating the fields or "stators" of the motors to vary the speed relation of the motors to be automatically maintained.

4. A segregated drive for paper making machines or the like, comprising a separate alternating current asynchronous motor of the wound rotor or armature type connected to an alternating current source of supply and having rotatable field and armature members, one of the members of each of the said motors arranged to be connected to a unit of the machine for driving the same, means for connecting the motor armatures in series relation with each other to a direct current source of supply to cause the motors to operate as synchronous motors and automatically maintain a predetermined speed relation of the motors, a separate controlling motor connected to rotate the field or "stator" of each of said motors, and means for controlling the speed and direction of operation of the said controlling motors to vary the speed of the said alternating current motors to be automatically maintained.

In witness whereof, I have hereunto set my hand this 11th day of July, 1922.

CLARENCE W. FICK.